J. M. PERLMAN.
VEHICLE BODY.
APPLICATION FILED JAN. 22, 1919.

1,329,627.

Patented Feb. 3, 1920.
2 SHEETS—SHEET 1.

INVENTOR
Jacques M. Perlman
BY
D. Anthony Usina, ATTORNEY

J. M. PERLMAN.
VEHICLE BODY.
APPLICATION FILED JAN. 22, 1919.
1,329,627.
Patented Feb. 3, 1920.
2 SHEETS—SHEET 2.
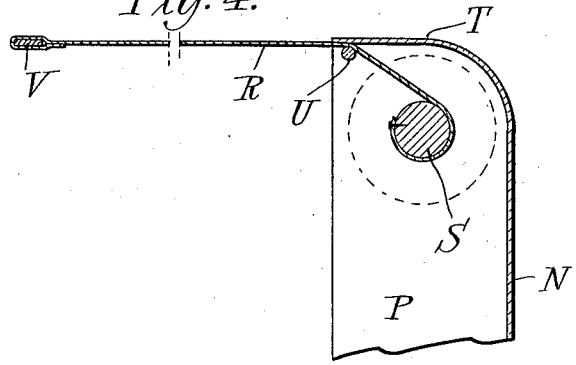
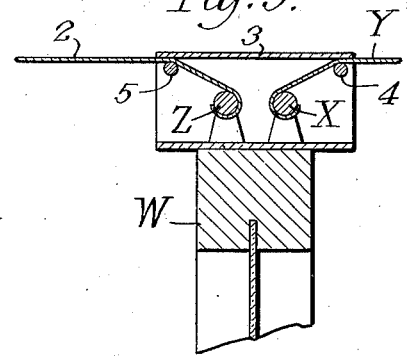
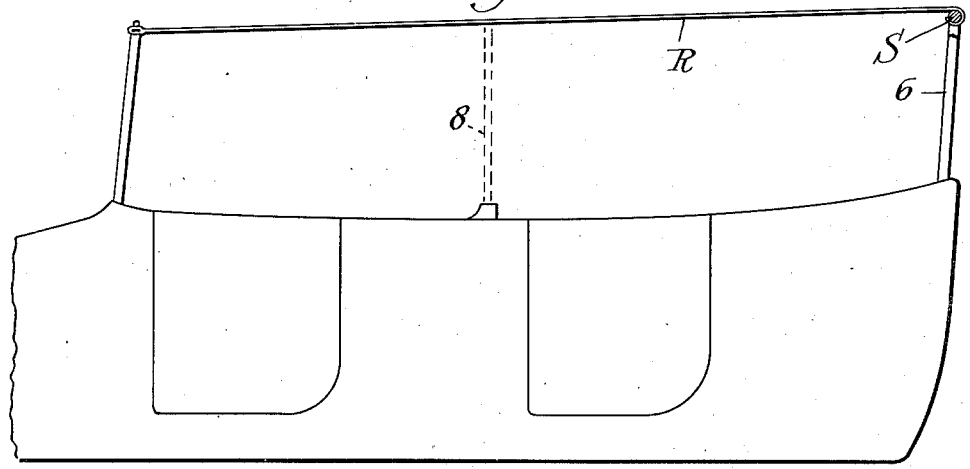
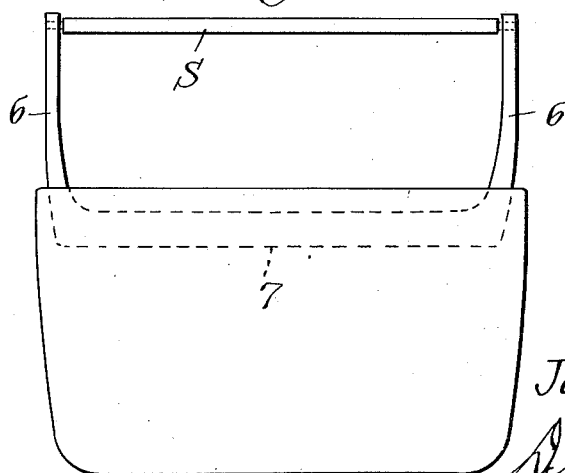
INVENTOR
Jacques M. Perlman
BY
D. Anthony Usma, ATTORNEY

UNITED STATES PATENT OFFICE.

JACQUES M. PERLMAN, OF NEW YORK, N. Y.

VEHICLE-BODY.

1,329,627.   Specification of Letters Patent.   Patented Feb. 3, 1920.

Application filed January 22, 1919. Serial No. 272,430.

*To all whom it may concern:*

Be it known that I, JACQUES M. PERLMAN, a citizen of the United States, residing at 126 West 22nd street, New York city, New York, have invented certain new and useful Improvements in Vehicle-Bodies, as described in the following specification.

My invention aims to provide an improved structure especially designed for use in automobiles whereby the car can be converted into the ordinary touring type with no top visible or into various other styles of closed or partly closed cars.

The entire structure may be carried by the car, thus avoiding the practice of carrying separate summer and winter bodies and changing them at need. The additional structure is light and in comparatively small parts which are easy to adjust from one position to another so that they can be manipulated by one man or by a woman. It can also be made cheaply and will be durable in good condition practically as long as the remainder of the car body. It provides not only for the ordinary closed types of car but also for a car with merely a light top adapted for protection against the sun in summer.

The accompanying drawings illustrate embodiments of the invention.

Figs. 4 and 5 are enlarged sections of details;

Fig. 6 is a side elevation and Fig. 7 is a rear elevation showing the invention applied solely to a shade top.

Referring to the embodiments of the invention illustrated, the fixed parts may be of the usual touring car type with a rear or passenger seat A, a forward or driver's seat B and sides containing doors C and D, a transverse partition E and a wind shield F. In the rear is a pocket G into which may be lowered a back extension and certain connected parts. The rear door carries a window H which can be raised as in Fig. 1, or lowered as in Fig. 2 and covered by pivoted side pieces J and K which fold down over the window when lowered. This type of window is well known. Similar sides L, with or without a window, and front windows M are provided in the sides of the car and in the front doors.

Figure 1:
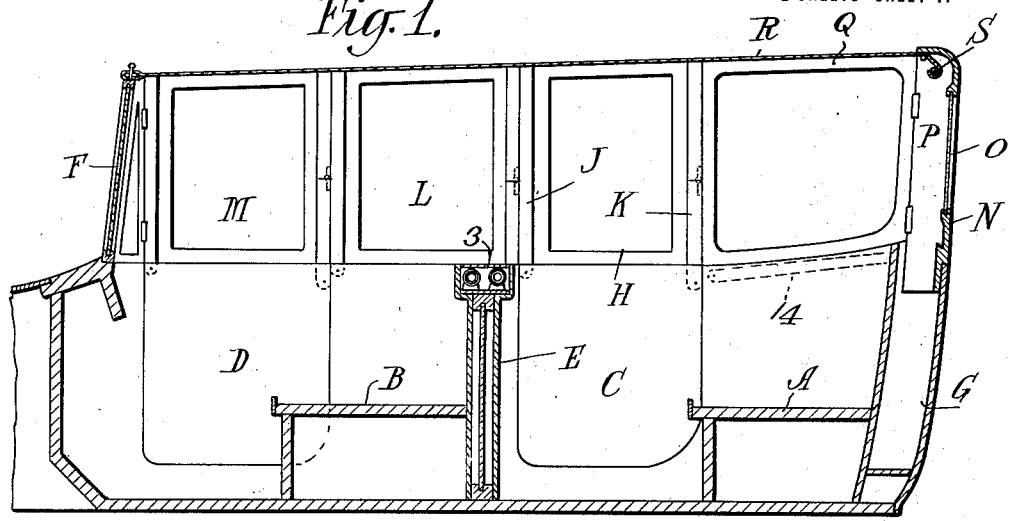
Figure 1 is a longitudinal section of a car body closed in the manner of the ordinary sedan.

The back extension comprises a plate N, preferably carrying a window O, and having forwardly extending side flanges P, on the edges of which are hinged sides Q, preferably also carrying windows, and adapted to be swung forward to the line of the members K at the rear of the doors C and to rest on the sides of the car as illustrated in Fig. 1. The side extensions Q may be swung back against the back extension N and lowered with it into the pocket G. This combination of back extension and rear side extensions can be used with a variety of devices for providing a top over more or less of the body.

In the case illustrated, the top consists of a flexible sheet R mounted on a spring roller S, the ends of which are carried in the top of the back extension N. Fig. 4 shows this detail on an enlarged scale. The back end has an overhanging top flange T and close up under its forward edge a small guiding rod U. The top R passes between the flange T and the rod U to the roller S, so that the top is always held close up against the flange T and makes a neat fit at this point. The roller is similar to the usual spring operated shade roller, and has stops to prevent complete unrolling with danger of tearing the sheet from the roller and the usual brake to prevent its rolling up too rapidly. The forward edge of the sheet is provided with a stiffening rod V which enlarges its thickness sufficiently to prevent its passing between the flange T and the rod U; so that it may be easily grasped and pulled forward when desired. When pulled forward to the limit its front edge will be fastened to the top of the wind shield, and it may be fastened to the other upwardly extending members at the side of the body wherever desired.

Figure 2:
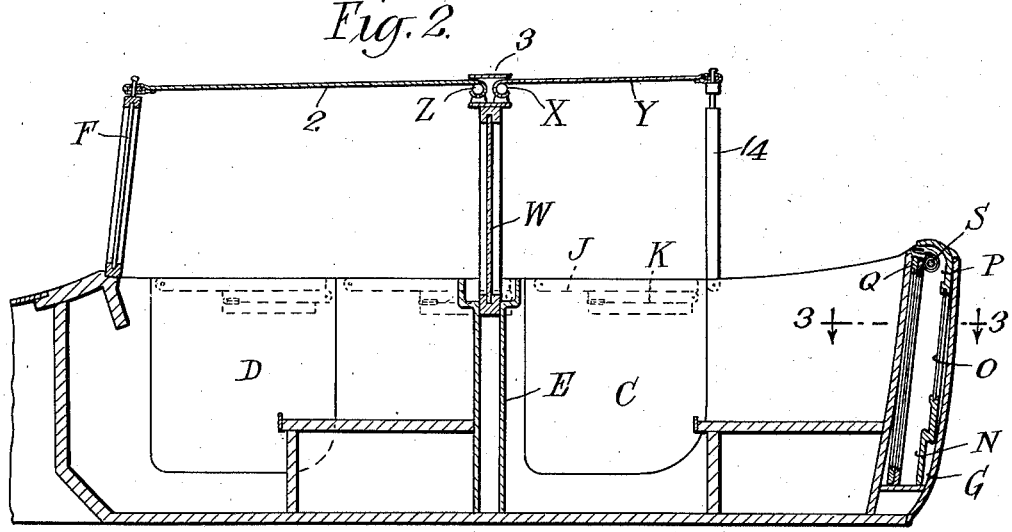
Fig. 2 is a similar view showing a top extended over the driver's seat and over the doors of the rear part somewhat in the manner of a landaulet.
Figure 3:
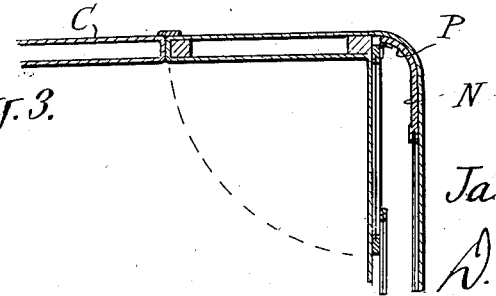
Fig. 3 is a horizontal section on the line 3—3 of Fig. 2.

The partition E is also formed as a pocket carrying an extension W which can be raised as in Fig. 2 and carrying at its upper edge a rear spring roller X on which is wound a sheet Y and a forward spring roller Z on which is rolled a sheet 2; these two rollers being covered by a plate 3 under which are guide rods 4 and 5, the construction of the rollers being the same as that described for the rear roller S. The forward sheet 2 may be drawn out and fastened to the wind shield, covering the driver and leaving the rear of the car open, and the rear sheet Y may be drawn back and fastened on posts 14 which are pivoted to the fixed sides of the body and adapted when not in use to swing down to the dotted line between as in Fig. 1; their forward movement being limited to the vertical position of Fig. 2, and the forward pull of the sheet Y serving to hold them upright. The sheet Y, when used alone, serves simply to protect the passengers. When both sheets Y and 2 are extended we have a shade or cover entirely for the forward end of the body and partly for the rear end, without cutting off the air from the sides; or in addition some or all of the side extensions may be raised, converting the car into a landaulet or similar type. And with the sheet Y, or both sheets Y and 2, extended the back extension may be lifted and the top R extended to a junction with the sheet Y. In fact the invention can be applied to cover the occupants of the car in a great variety of ways and to any desired extent and to protect them against the sun alone without preventing access of fresh air, or against cold weather, or rain or snow; providing in fact for all known styles of tops and for some styles which are new. The transverse extension W, with either or both of the extensible tops Y and 2 may also be provided without the extensible top R, the sheet Y in that case being made long enough to run to the back extension N; or the back extension and all the parts carried thereby may be omitted, carrying only the front extension and one or both of the tops Y and 2 where protection from the sun alone is desired.

It is also feasible to apply the roll top feature of the invention in the manner indicated in Figs. 6 and 7. Here the sheet R is the only top used and it is mounted on a roll S which is carried between the upper ends of the uprights 6 connected at their lower ends by a cross-bar 7 so as to form a broad U-shaped frame which when the top is rolled can be lowered into a pocket in the rear of the body. When this frame is lifted and the top R extended it forms a sun shade without in any degree cutting off access of fresh air to the occupants of the car. If the car be provided with posts 8 (Fig. 6) which can be raised or lowered into suitable pockets the forward edges of the top R may be fastened to these posts so as to cover only the rear part of the car.

For a mere sun shade, as in Figs. 6 and 7, the material of the top R may be made very light, as of light canvas or the like, or of course it can be made as heavy as desired. Where this is to be used for protection against rain or snow it must be heavier and leather or other composition or fabric will be better, the only essential being that the material is flexible enough to be coiled on its roller. The material of the other parts may be metal or wood or may be cloth or similar composition stiffened by means of frames. In fact any usual or suitable material may be used.

The back extension, with the parts attached thereto may be arranged, instead of dropping into a pocket as shown, to swing back to approximately a horizontal position like the collapsible tops commonly in use, or to any other desired angle, and may be inclosed in an envelop of the ordinary type for the sake of appearance and protection from the weather. Either the pocket arrangement or the hinged arrangement can be provided according to the desire of the purchaser of the car, it being only necessary that the extension be mounted on the back solidly so as to avoid vibration. The various side and back extensions and the top can be mounted on an old body, either by hinging the back extension thereto or by providing a pocket and arranging the parts to drop into the pocket as above described. The roller may be detachably mounted on its support. Also the back extension with its connected parts may be detachable as a whole from the body, avoiding the necessity of a pocket or other means for holding it on the body when not in use.

The principle of the flexible top adapted to be contracted into a roll may also be applied to other parts of the car, as for example, to the top of the wind shield and adapted to be pulled out to cover all or a part of the car.

Various other modifications may be made and the several parts of the structure may be used separately or in other combinations than those shown without departing from the invention as defined in the following claims.

What I claim is:—

1. A vehicle body comprising a back extension, rear side extensions hinged to the sides of said back extensions, a roller mounted on the upper part of said back extension, and a top connected at one edge of said roller and adapted to be rolled thereon or to be unrolled and extended forward therefrom.

2. A vehicle body comprising a back extension, a transverse partition extension, an extensible top carried by said back extension and adapted to extend therefrom to the partition extension and an extensible top carried by said partition extension and adapted to extend therefrom backward and means for holding the rear edge of the last mentioned top at a point between the back and the transverse partition.

3. A vehicle body comprising a back extension, a transverse partition extension, means for closing the sides between said extensions when elevated, an extensible top carried by said back extension and adapted to reach therefrom to the partition extension to form a completely closed passenger compartment and an extensible top carried by the partition extension and adapted to reach therefrom backward over a portion of the rear compartment so as to form a landaulet.

In witness whereof, I have hereunto signed my name.

JACQUES M. PERLMAN.